(12) United States Patent  
Charnesky et al.

(10) Patent No.: US 8,454,077 B2  
(45) Date of Patent: Jun. 4, 2013

(54) HEADERLESS OPPOSING HINGED DOORS

(75) Inventors: Scott P. Charnesky, Birmingham, MI (US); Kerry A. Charnesky, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 135 days.

(21) Appl. No.: 13/094,878

(22) Filed: Apr. 27, 2011

(65) Prior Publication Data

US 2012/0272579 A1 Nov. 1, 2012

(51) Int. Cl.
*B60J 1/17* (2006.01)
*B60J 5/04* (2006.01)

(52) U.S. Cl.
USPC .................. 296/146.2; 296/146.9; 296/146.1; 49/502

(58) Field of Classification Search
USPC ........... 296/150, 146.2, 146.3, 146.9, 146.11, 296/93, 146.1, 147; 49/502
See application file for complete search history.

(56) References Cited

U.S. PATENT DOCUMENTS

| | | | | |
|---|---|---|---|---|
| 2,997,336 A | * | 8/1961 | Huggins et al. | 296/106 |
| 3,541,732 A | * | 11/1970 | Hanson | 49/440 |
| 4,407,540 A | * | 10/1983 | Korff | 296/146.2 |
| 4,635,420 A | * | 1/1987 | Batky | 52/309.1 |
| 4,988,142 A | * | 1/1991 | Chandler et al. | 296/146.2 |
| 2003/0116994 A1 | * | 6/2003 | Richtor et al. | 296/146.16 |
| 2009/0001755 A1 | * | 1/2009 | Fuetterer | 296/146.16 |
| 2010/0156140 A1 | * | 6/2010 | Elliott et al. | 296/146.5 |
| 2012/0091749 A1 | * | 4/2012 | Charnesky et al. | 296/146.1 |
| 2012/0133175 A1 | * | 5/2012 | Charnesky et al. | 296/146.4 |
| 2012/0153678 A1 | * | 6/2012 | Konchan et al. | 296/202 |

FOREIGN PATENT DOCUMENTS

JP 362039317 A * 2/1987 .................. 296/146.9

* cited by examiner

*Primary Examiner* — Jason S Morrow
(74) *Attorney, Agent, or Firm* — Quinn Law Group, PLLC

(57) ABSTRACT

A pair of opposing hinged doors includes a first door and a second door having a first window panel and a second window panel respectively. The first window panel moves along a first path that initially guides the first window panel away from the second window panel and then guides the first window panel vertically downward when moving from an extended position into a retracted position. Similarly, the second window panel moves along a second path that initially guides the second window panel away from the first window panel and then guides the second window panel vertically downward when moving from an extended position into a retracted position. The movement of the first window panel and the second window panel along the first path and the second path respectively allows for the first door and the second door to be independently openable relative to each other.

17 Claims, 4 Drawing Sheets

HEADERLESS OPPOSING HINGED DOORS

TECHNICAL FIELD

The invention generally relates to a pair of headerless opposing hinged doors for a vehicle in which window panels of each of the opposing hinged doors seal against each other.

BACKGROUND

Opposing-hinged doors on vehicles include a first door and a second door arranged on the same side of the vehicle, longitudinally adjacent to each other, with the first door disposed nearer a first end of the vehicle, e.g., a front end of the vehicle, than the second door. Each of the opposing-hinged doors pivots open in an opposite direction. More specifically, the first door includes a forward edge disposed nearer the first end of the vehicle and a rearward edge disposed nearer a second end of the vehicle, e.g., a rearward end of the vehicle. The first door is hinged along the forward edge of the first door, and pivots open in a first pivot direction such that the rearward edge of the first door swings away from the vehicle when opening the first door and toward the vehicle when closing the first door. The second door also includes a forward edge disposed nearer the first end of the vehicle and a rearward edge disposed nearer the second end of the vehicle. The second door is hinged along the rearward edge of the second door, and pivots in a second pivot direction, which is opposite the first pivot direction, such that the forward edge of the second door swings away from the vehicle when opening the second door and toward the vehicle when closing the second door. Accordingly, the first door and the second door open and close in opposite directions.

Opposing-hinged doors may not include a body pillar disposed between the first door and the second door. When no body pillar exists between the first door and the second door, the first door and the second door are arranged immediately adjacent each other in sealing engagement. Typically, the opposing-hinged doors are arranged such that the more forward door, i.e., the first door, must be opened prior to and in order to open the more rearward door, i.e., the second door. In other words, opening the more rearward second door is dependent upon opening the more forward first door beforehand.

Opposing hinged doors that do not include a body pillar between the first door and the second door have in the past included a framework defining a window opening. The framework seals against the body and against the opposing door of the opposing hinged doors, with a window panel vertically moveable relative to the framework. The window panel of each of the first door and the second door has in the past sealed against the framework defining the window opening.

SUMMARY

A vehicle is provided that includes a body, a first door and a second door. The first door is pivotably moveable relative to the body in a first pivot direction between an open position and a closed position. The first door includes a first window panel that is moveable along a first path between an extended position and a refracted position. The second door is pivotably moveable relative to the body in a second pivot direction between an open position and a closed position. The second door includes a second window panel moveable along a second path between an extended position and a retracted position. The second pivot direction is opposite the first pivot direction. The first window panel travels along the first path away from and out of sealing engagement with the second window panel, and then vertically downward when moving from the extended position into the retracted position. The initial movement away from the second window panel permits independent pivotable movement of the first door relative to the second door. The first window panel travels along the first path vertically upward and then toward and into sealing engagement with the second window panel when moving from the retracted position into the extended position. The second window panel travels along the second path away from and out of sealing engagement with the first window panel, and then vertically downward when moving from the extended position into the retracted position. The initial movement away from the first window panel permits independent pivotable movement of the second door relative to the first door. The second window panel travels along the second path vertically upward and then toward and into sealing engagement with the first window panel when moving from the retracted position into the extended position.

A vehicle including a body, a first door and a second door is also provided. The first door is pivotably moveable relative to the body in a first pivot direction between an open position and a closed position. The first door includes a first window panel that is moveable along a first path between an extended position and a retracted position. The second door is pivotably moveable relative to the body in a second pivot direction between an open position and a closed position. The second door includes a second window panel that is moveable along a second path between an extended position and a retracted position. The second pivot direction is opposite the first pivot direction. The first door and the second door are disposed adjacent each other and in sealing engagement with each other when each of the first door and the second door are in their respective closed positions. The first window panel and the second window panel are disposed in sealing engagement with each other when the first window panel and the second window panel are disposed in their respective extended positions. A seal is affixed to and moveable with at least one of the first window panel and the second window panel. The seal is configured for sealing between the first window panel and the second window panel when in their respective extended positions. At least one of the first door and the second includes a handle. The handle is operatively connected to one of the first window panel and the second window panel. The one of the first window panel and the second window panel operatively connected to the handle is automatically moveable from the extended position into the retracted position to disengage the seal between the first window panel and the second window panel upon actuation of the handle. The first window panel travels along the first path away from and out of sealing engagement with the second window panel, and then vertically downward when moving from the extended position into the retracted position. The initial movement away from the second window panel permits independent pivotable movement of the first door relative to the second door. The first window panel travels along the first path vertically upward and then toward and into sealing engagement with the second window panel when moving from the retracted position into the extended position. The second window panel travels along the second path away from and out of sealing engagement with the first window panel, and then vertically downward when moving from the extended position into the retracted position. The initial movement away from the first window panel permits independent pivotable movement of the second door relative to the first door. The second window panel travels along the second path vertically upward and then toward and into sealing engagement with the first window panel when moving from the retracted position into the extended position.

A pair of headerless opposing hinged doors are also provided. The pair of headerless opposing hinged doors include a first door and a second door. The first door is pivotably moveable in a first pivot direction between an open position and a closed position. The first door includes a first window panel that is moveable along a first path between an extended position and a retracted position. The second door is pivotably moveable in a second pivot direction between an open position and a closed position. The second door includes a second window panel that is moveable along a second path between an extended position and a retracted position. The second pivot direction is opposite the first pivot direction. The first window panel and the second window panel are disposed in sealing engagement with each other when the first window panel and the second window panel are disposed in their respective extended positions. The first window panel travels along the first path away from and out of sealing engagement with the second window panel, and then vertically downward when moving from the extended position into the retracted position. The initial movement away from the second window panel permits independent pivotable movement of the first door relative to the second door. The first window panel travels along the first path vertically upward and then toward and into sealing engagement with the second window panel when moving from the retracted position into the extended position. The second window panel travels along the second path away from and out of sealing engagement with the first window panel, and then vertically downward when moving from the extended position into the retracted position. The initial movement away from the first window panel permits independent pivotable movement of the second door relative to the first door. The second window panel travels along the second path vertically upward and then toward and into sealing engagement with the first window panel when moving from the retracted position into the extended position.

Accordingly, the first window panel and the second window panel travel along the first path and the second path respectively away from each other to disengage the first window panel and/or the second window panel from sealing engagement therebetween. Once the first window panel and the second window panel are no longer in sealing engagement with each other, then the first window panel and/or the second window panel may move vertically downward into their respective retracted position. Furthermore, once the first window panel and/or the second window panel are moved out of sealing engagement, the first door and/or the second door may be independently opened regardless of the position of the other of the opposing hinged doors. As such, the movement of the first window panel and the second window panel along the first path and the second path respectively allows for the headerless opposing hinged door system in which the doors include no framework around the window panels, and in which the window panels seal against themselves.

The above features and advantages and other features and advantages of the present invention are readily apparent from the following detailed description of the best modes for carrying out the invention when taken in connection with the accompanying drawings.

DETAILED DESCRIPTION

Figure 1:
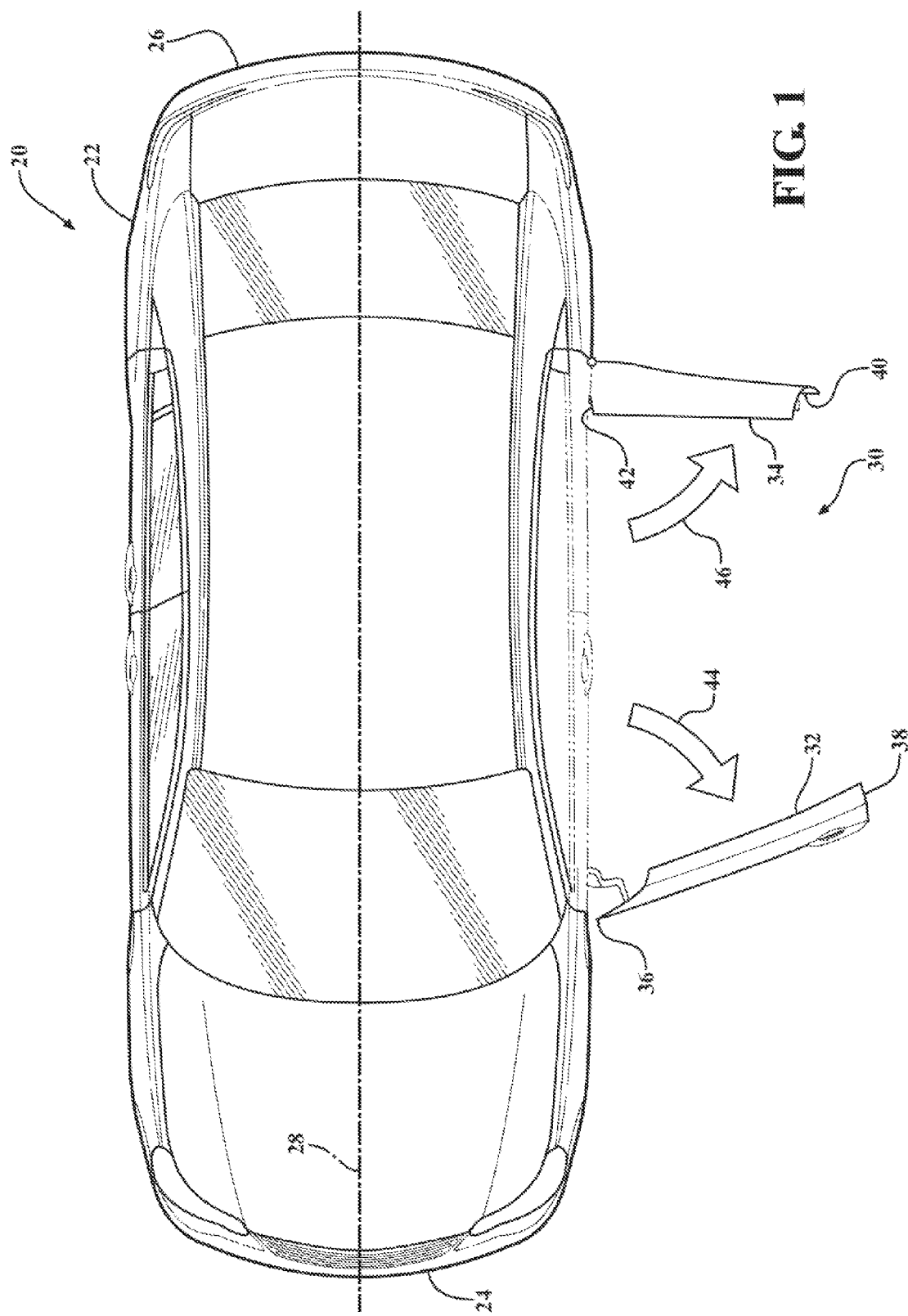
FIG. 1 is a schematic plan view of a vehicle showing a pair of opposing hinged doors in an open position.

Referring to the Figures, wherein like numerals indicate like parts throughout the several views, a vehicle is shown generally at 20. The vehicle 20 may include any style and/or size of vehicle 20 including but not limited to a passenger car, a sport utility vehicle 20 or a van. Referring to FIG. 1, the vehicle 20 includes a body 22. The body 22 may include a frame and any structural support elements attached thereto, as well as the outer sheet metal coverings attached to the frame and/or structural elements of the vehicle 20.

While the present invention is described in detail with respect to automotive applications, those skilled in the art will recognize the broader applicability of the invention. Those having ordinary skill in the art will also recognize that terms such as "above," "below," "upward," "downward," "forward," "rearward," et cetera, are used descriptively of the figures, and do not represent limitations on the scope of the invention, as defined by the appended claims.

The body 22 includes a first end 24 and a second end 26. The second end 26 of the body 22 is disposed opposite the first end 24 along a longitudinal axis 28 of the body 22. As shown, the first end 24 of the vehicle 20 includes a front of the vehicle 20. However, the first end 24 of the vehicle 20 is not limited to the front of the vehicle 20. As shown, the second end 26 includes a back end of the vehicle 20. However, the second end 26 of the vehicle 20 is not limited to the back of the vehicle 20. The longitudinal axis 28 extends between the first end 24 and the second end 26 of the vehicle 20.

The vehicle 20 further includes a pair of opposing hinged doors 30 mounted to the body 22. The pair of opposing hinged doors 30 may include any pair of opposing hinged closure panels, including but not limited to, side occupant doors, rear cargo doors, windows, etc. As shown, the opposing hinged doors 30 are disposed adjacent each other on the same longitudinal side of the body 22, and open in opposite directions, away from each other to provide a continuous, i.e., unobstructed, opening into an interior compartment of the vehicle 20. It should be appreciated that the pair of opposing-hinged doors may be disposed elsewhere on the vehicle 20, for example at the rear end of the vehicle 20.

The pair of opposing hinged doors 30 includes a first door 32 and a second door 34. The first door 32 and the second door 34 are disposed on the same side of the vehicle 20, adjacent each other. As shown, the first door 32 is disposed nearer the first end 24 of the body 22 than the second door 34, and the second door 34 is disposed nearer the second end 26 of the body 22 than the first door 32. However, it should be appreciated that the positions of the first door 32 and the second door 34 relative to the first end 24 and the second end 26 of the vehicle 20 may be reversed from that shown in the Figures.

The first door 32 includes a first edge 36 and a second edge 38. The second edge 38 of the first door 32 is disposed opposite the first edge 36 along the longitudinal axis 28 of the body 22 when the first door 32 is closed. Accordingly, the first edge 36 and the second edge 38 of the first door 32 define a forward edge and a rearward edge of the first door 32 respectively. As shown, the first edge 36 of the first door 32 is disposed nearer the first end 24 of the body 22 than the second edge 38 of the first door 32, and the second edge 38 of the first door 32 is disposed nearer the second end 26 of the body 22 than the first edge 36 of the first door 32. However, it should be appreciated that the positions of the first edge 36 and the second edge 38 of the first door 32 may be reversed from that shown in the Figures.

The second door 34 is pivotably attached to the body 22. The second door 34 includes a first edge 40 and a second edge 42. The first edge 40 of the second door 34 is disposed opposite the second edge 42 along the longitudinal axis 28 of the body 22 when the second door 34 is closed. Accordingly, the first edge 40 and the second edge 42 of the second door 34 define a forward edge and a rearward edge of the second door 34. As shown, the first edge 40 of the second door 34 is disposed nearer the first end 24 of the body 22 than the second edge 42 of the second door 34, and the second edge 42 of the second door 34 is disposed nearer the second end 26 of the body 22 than the first edge 40 of the second door 34. However, it should be appreciated that the positions of the first edge 40 and the second edge 42 of the second door 34 may be reversed from that shown in the Figures.

Figure 2:
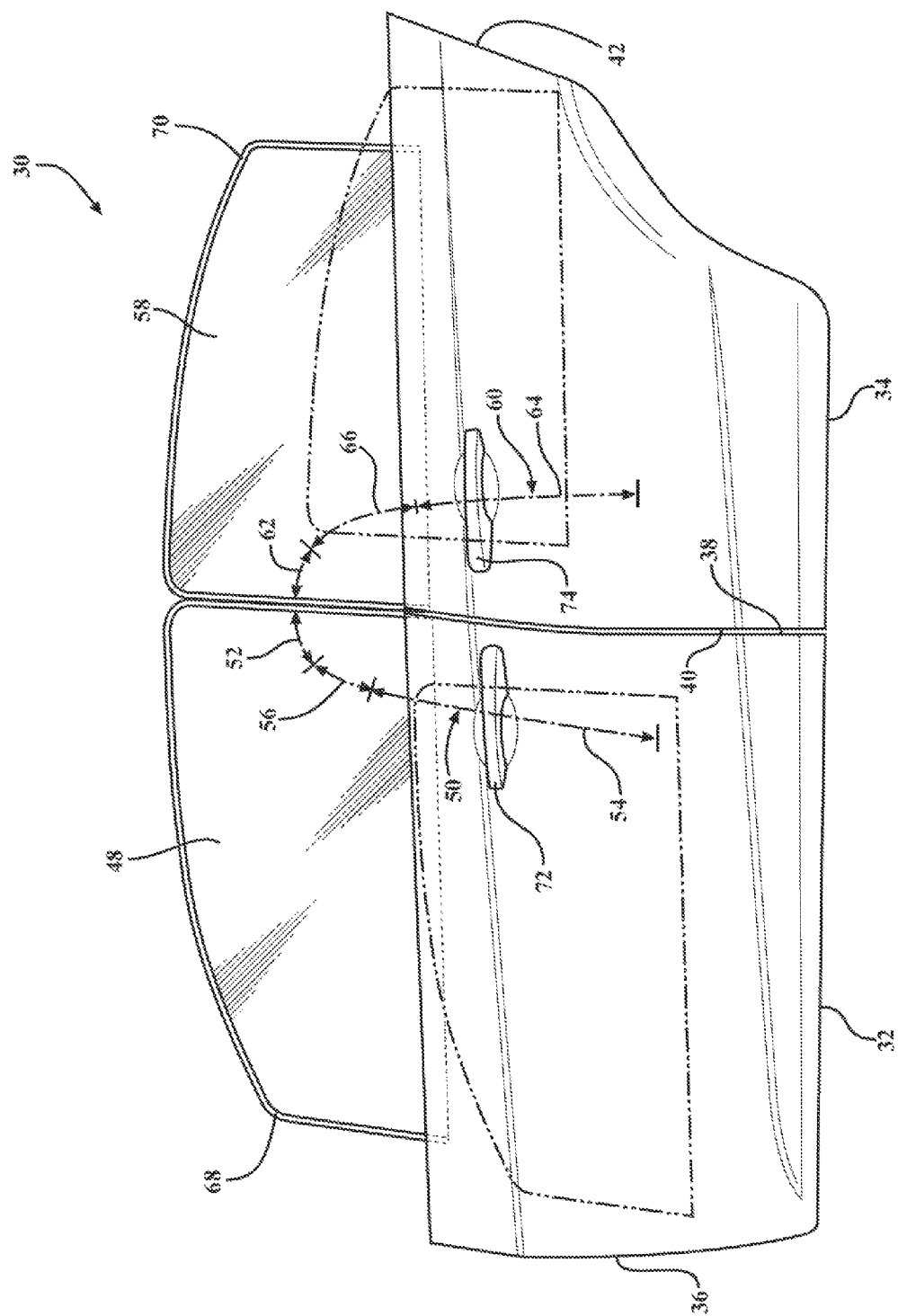
FIG. 2 is a schematic plan view of the pair of opposing hinged doors in a closed position with window panels in an extended position.
Figure 3:
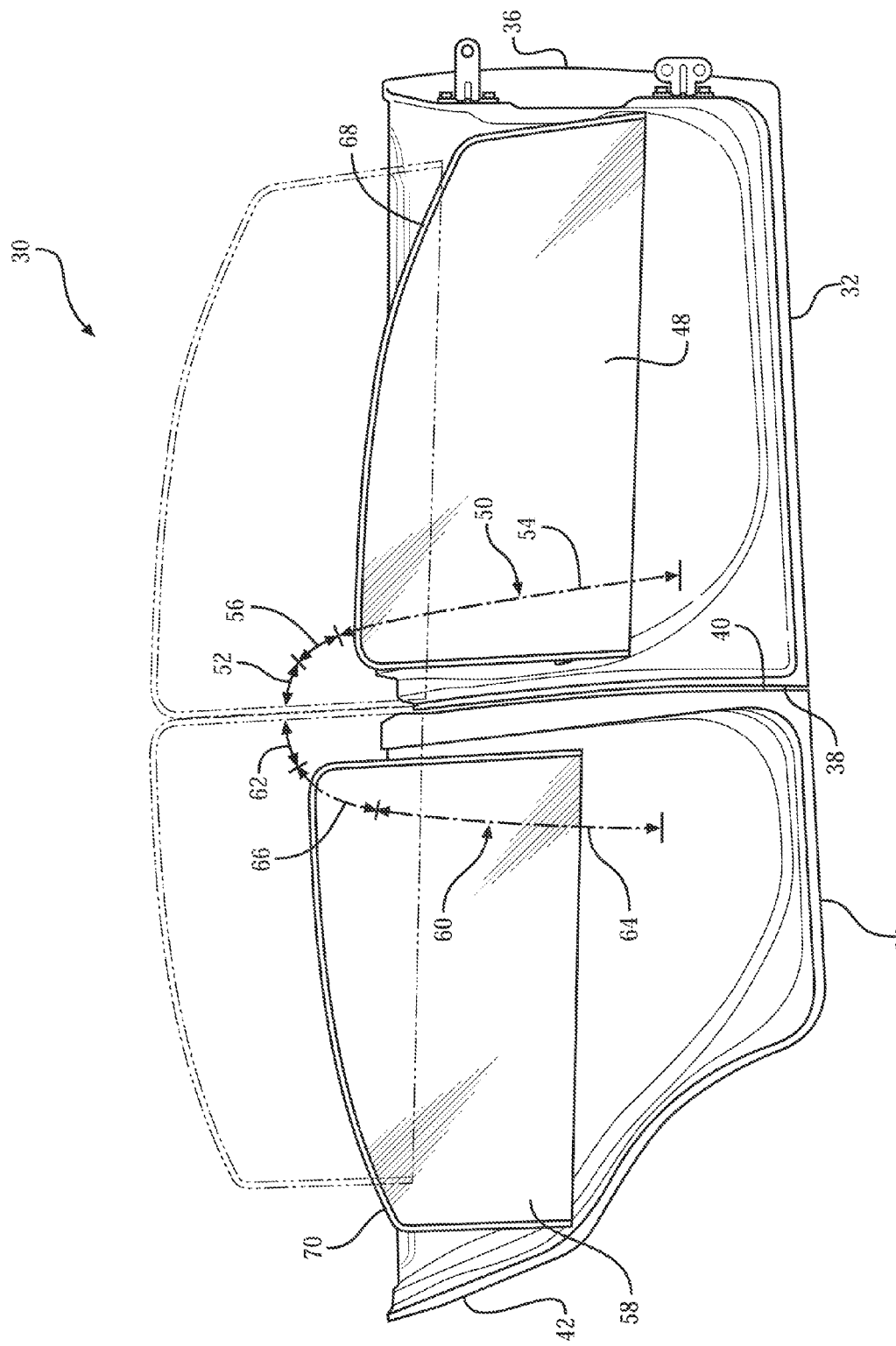
FIG. 3 is a schematic plan view of the pair of opposing hinged doors in the closed position with the window panels in a retracted position.

The first door 32 is moveable between an open position, shown in FIG. 1, and a closed position, shown in FIGS. 2 and 3. The first door 32 pivots into the open position in a first pivot direction 44. The second door 34 is moveable between an open position, shown in FIG. 1, and a closed position, shown in FIGS. 2 and 3. The second door 34 pivots open in a second pivot direction 46. The second pivot direction 46 is opposite the first pivot direction 44. As such, the first pivot direction 44 may include one of a counterclockwise direction and a clockwise direction, with the second pivot direction 46 including the other of the counterclockwise direction and the clockwise direction. As shown in FIG. 1, the first pivot direction 44 includes the clockwise direction, and the second pivot direction 46 includes the counterclockwise direction.

The first door 32 and the second door 34 are "opposing hinged doors 30" as the first door 32 and the second door 34 pivot open respectively in opposite directions. The first door 32 and the second door 34 are disposed adjacent each other and in sealing engagement with each other when each of the first door 32 and the second door 34 are in their respective closed positions. The opposing-hinged doors allow for a continuous opening defined by the body 22, with no B-pillar disposed between the first door 32 and the second door 34. The first door 32 and the second door 34 are independently openable and closeable, i.e., may be opened and closed in either order or simultaneously.

The first door 32 includes a first window panel 48. The first window panel 48 is preferably manufactured from glass, but may alternatively be manufactured from some other material. The first window panel 48 is moveable along a first path 50 between an extended position, i.e., a raised position shown in FIG. 2, and a retracted position, i.e., a lowered position shown in FIG. 3. The first path 50 includes a substantially horizontal portion 52 and a substantially vertical portion 54. A curved portion 56 connects the substantially horizontal portion 52 and the substantially vertical portion 54.

The second door 34 includes a second window panel 58. The second window panel 58 is preferably manufactured from glass, but may alternatively be manufactured from some other material. The second window panel 58 is moveable along a second path 60 between an extended position, i.e., a raised position shown in FIG. 2, and a retracted position, i.e., a lowered position shown in FIG. 3. The second path 60 includes a substantially horizontal portion 62 and a substantially vertical portion 64. A curved portion 66 connects the substantially horizontal portion 62 and the substantially vertical portion 64. The second path 60 is an approximate mirror image of the first path 50, mirrored along an imaginary vertical line that separates the first door 32 from the second door 34.

The first window panel 48 and the second window panel 58 are disposed in sealing engagement with each other and the body 22 of the vehicle 20 when the first window panel 48 and the second window panel 58 are disposed in their respective extended positions. Accordingly, because the first window panel 48 and the second window panel 58 seal against each other and the body 22 of the vehicle 20 when in their respective extended positions, and do not include any form of framework attached to the first door 32 and the second door 34 respectively for supporting the first window panel 48 and the second window panel 58, the first door 32 and the second door 34 form a headerless opposing hinged door system.

The first window panel 48 travels along the first path 50 away from and out of sealing engagement with the second window panel 58 and then vertically downward when moving from the extended position into the retracted position. As such, the first window panel 48 initially moves along the substantially horizontal portion 52 of the first path 50 to move the first window panel 48 away from the second window panel 58. The first window panel 48 then moves through the curved portion 56 of the first path 50 and transitions into the substantially vertical portion 54 of the first path 50 when moving from the extended position into the retracted position. Movement away from the second window panel 58 along the substantially horizontal portion 52 of the first path 50, permits independent pivotable movement of the first door 32 relative to the second door 34, i.e., the first door 32 may be independently opened or closed regardless of the position of the second door 34. When moving from the retracted position into the extended position, the path described above is reversed. As such, the first window panel 48 travels along the first path 50 vertically upward along the substantially vertical portion 54 of the first path 50, and then toward and into sealing engagement with the second window panel 58 along the substantially horizontal portion 52 of the first path 50.

The second window panel 58 travels along the second path 60 away from and out of sealing engagement with the first window panel 48 and then vertically downward when moving from the extended position into the retracted position. As such, the second window panel 58 initially moves along the substantially horizontal portion 62 of the second path 60 to move the second window panel 58 away from the first window panel 48. The second window panel 58 then moves through the curved portion 66 of the second path 60 and transitions into the substantially vertical portion 64 of the second path 60 when moving from the extended position into the retracted position. Movement away from the first window panel 48 along the substantially horizontal portion 62 of the second path 60, permits independent pivotable movement of the second door 34 relative to the first door 32, i.e., the second door 34 may be independently opened or closed regardless of the position of the first door 32. When moving from the retracted position into the extended position, the path described above is reversed. As such, The second window panel 58 travels along the second path 60 vertically upward along the substantially vertical portion 64 of the second path 60, and then toward and into sealing engagement with the first window panel 48 along the substantially horizontal portion 62 of the second path 60.

Figure 4:
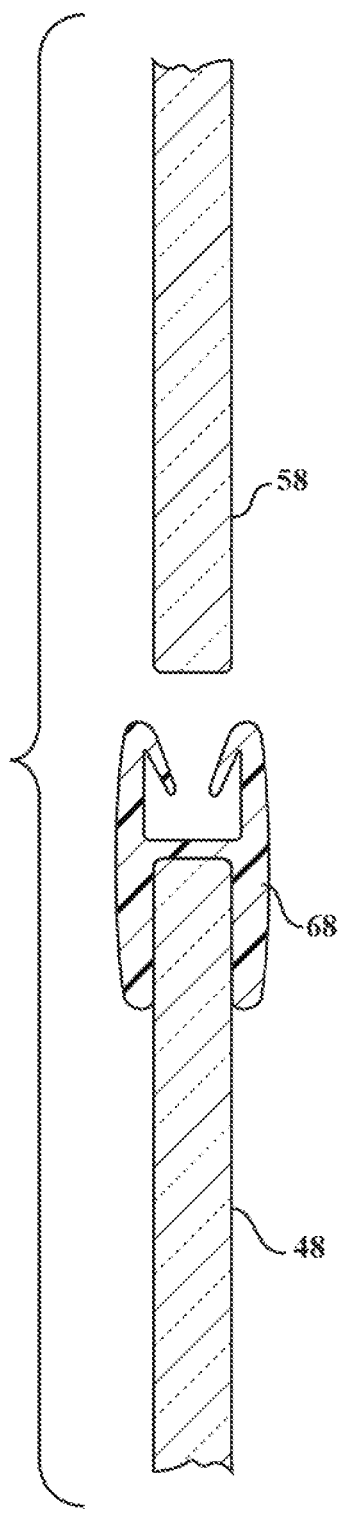
FIG. 4 is a schematic fragmentary cross sectional view of the window panels in the retracted position with a seal affixed to one of the window panels.
Figure 5:
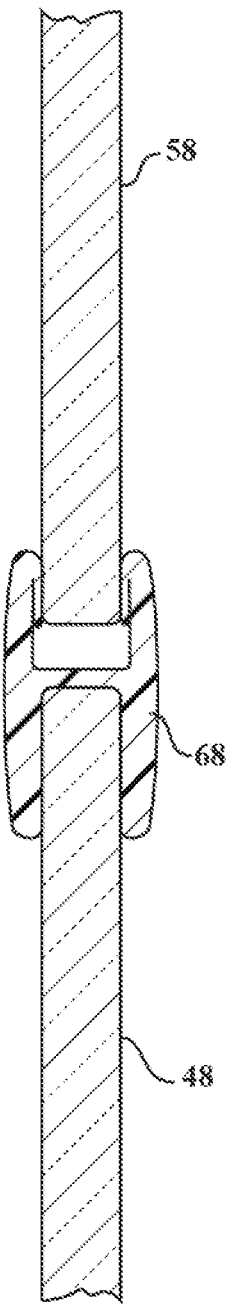
FIG. 5 is a schematic fragmentary cross sectional view of the window panels in the extended position with the seal affixed to one of the window panels and in sealing engagement with the other window panel.

A seal 68, 70 is affixed to and moveable with at least one of the first window panel 48 and the second window panel 58. As shown in FIGS. 2 and 3, the seal 68, 70 includes a first seal 68 affixed to and moveable with the first window panel 48, and a second seal 70 affixed to and moveable with the second window panel 58. The seal 68, 70 is configured for sealing between the first window panel 48 and the second window panel 58 when in their respective extended positions. The seal 68, 70 may be disposed about an outer periphery of the first window panel 48 and/or the second window panel 58, and also provide a sealing surface for the first window panel 48 and/or the second window panel 58 to seal against the body 22 of the vehicle 20. The seal 68, 70 may include any suitable configuration and/or shape. As shown in FIGS. 4 and 5, the seal 68 includes a single seal attached to the first window panel 48 and configured for sealing against the second window panel 58. FIG. 4 shows the window panels 48, 58 slightly separated, with the seal 68 disengaged from the second window panel 58. FIG. 5 shows the first window panel 48 and the second window panel 58 adjacent each other and in sealing engagement with the seal 68. However, it should be appreciated that the specific configuration of the seal is not limited to that shown in the exemplary embodiment of FIGS. 4 and 5.

At least one of the first door 32 and the second door 34 may include a handle 72, 74 that is operatively connected to one of the first window panel 48 and the second window panel 58 respectively. For example, the first door 32 may include a first handle 72 that is operatively connected to the first window panel 48, and/or the second door 34 may include a second handle 74 that is operatively connected to the second window panel 58. The one of the first window panel 48 and the second window panel 58 that is operatively connected to the handle 72, 74 may be configured to be automatically moveable from the extended position into the retracted position to disengage the seal between the first window panel 48 and the second window panel 58 upon actuation of the handle 72, 74. As such, upon a user actuating the handle, for example, the second handle 74 of the second door 34, the second window panel 58, if disposed in the extended position, may be configured to automatically move from the extended position into the retracted position to permit the independent opening and/or closing the second door 34 relative to the first door 32. It should be appreciated that the first door 32 may be similarly configured.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a body;
   a first door pivotably moveable relative to the body in a first pivot direction between an open position and a closed position, and including a first window panel moveable along a first path between an extended position and a retracted position;
   a second door pivotably moveable relative to the body in a second pivot direction between an open position and a closed position, and including a second window panel moveable along a second path between an extended position and a retracted position;
   wherein the second pivot direction is opposite the first pivot direction;
   wherein the first window panel travels along the first path away from and out of sealing engagement with the second window panel and then vertically downward when moving from the extended position into the retracted position to permit independent pivotable movement of the first door relative to the second door, and the first window panel travels along the first path vertically upward and then toward and into sealing engagement with the second window panel when moving from the retracted position into the extended position; and
   wherein the second window panel travels along the second path away from and out of sealing engagement with the first window panel and then vertically downward when moving from the extended position into the retracted position to permit independent pivotable movement of the second door relative to the first door, and the second window panel travels along the second path vertically upward and then toward and into sealing engagement with the first window panel when moving from the retracted position into the extended position.

2. A vehicle as set forth in claim 1 wherein the first door and the second door are disposed adjacent each other and in sealing engagement with each other when each of the first door and the second door are in their respective closed positions.

3. A vehicle as set forth in claim 1 wherein the first window panel and the second window panel are disposed in sealing engagement with each other when the first window panel and the second window panel are disposed in their respective extended positions.

4. A vehicle as set forth in claim 3 further comprising a seal affixed to and moveable with at least one of the first window panel and the second window panel and configured for sealing between the first window panel and the second window panel when in their respective extended positions.

5. A vehicle as set forth in claim 4 wherein the seal includes a first seal affixed to and moveable with the first window panel and a second seal affixed to and moveable with the second window panel.

6. A vehicle as set forth in claim 4 wherein the seal is disposed about an outer periphery of one of the first window panel and the second window panel.

7. A vehicle as set forth in claim 4 wherein at least one of the first door and the second include a handle operatively connected to one of the first window panel and the second window panel, wherein the one of the first window panel and the second window panel operatively connected to the handle is automatically moveable from the extended position into the retracted position to disengage the seal between the first window panel and the second window panel upon actuation of the handle.

8. A vehicle as set forth in claim 1 wherein the first path and the second path each include a substantially horizontal portion and a substantially vertical portion.

9. A vehicle as set forth in claim 8 wherein the substantially horizontal portion and the substantially vertical portion are connected by a curved portion.

10. A vehicle comprising:
    a body;
    a first door pivotably moveable relative to the body in a first pivot direction between an open position and a closed position, and including a first window panel moveable along a first path between an extended position and a retracted position;
    a second door pivotably moveable relative to the body in a second pivot direction between an open position and a closed position, and including a second window panel moveable along a second path between an extended position and a refracted position;

wherein the second pivot direction is opposite the first pivot direction;

wherein the first door and the second door are disposed adjacent each other and in sealing engagement with each other when each of the first door and the second door are in their respective closed positions;

wherein the first window panel and the second window panel are disposed in sealing engagement with each other when the first window panel and the second window panel are disposed in their respective extended positions;

a seal affixed to and moveable with at least one of the first window panel and the second window panel and configured for sealing between the first window panel and the second window panel when in their respective extended positions;

wherein at least one of the first door and the second includes a handle operatively connected to one of the first window panel and the second window panel, wherein the one of the first window panel and the second window panel operatively connected to the handle is automatically moveable from the extended position into the retracted position to disengage the seal between the first window panel and the second window panel upon actuation of the handle;

wherein the first window panel travels along the first path away from and out of sealing engagement with the second window panel and then vertically downward when moving from the extended position into the retracted position to permit independent pivotable movement of the first door relative to the second door, and the first window panel travels along the first path vertically upward and then toward and into sealing engagement with the second window panel when moving from the retracted position into the extended position; and wherein the second window panel travels along the second path away from and out of sealing engagement with the first window panel and then vertically downward when moving from the extended position into the retracted position to permit independent pivotable movement of the second door relative to the first door, and the second window panel travels along the second path vertically upward and then toward and into sealing engagement with the first window panel when moving from the retracted position into the extended position.

11. A pair of headerless opposing hinged doors comprising:

a first door pivotably moveable in a first pivot direction between an open position and a closed position, and including a first window panel moveable along a first path between an extended position and a retracted position;

a second door pivotably moveable in a second pivot direction between an open position and a closed position, and including a second window panel moveable along a second path between an extended position and a retracted position;

wherein the second pivot direction is opposite the first pivot direction;

wherein the first window panel and the second window panel are disposed in sealing engagement with each other when the first window panel and the second window panel are disposed in their respective extended positions;

wherein the first window panel travels along the first path away from and out of sealing engagement with the second window panel and then vertically downward when moving from the extended position into the retracted position to permit independent pivotable movement of the first door relative to the second door, and the first window panel travels along the first path vertically upward and then toward and into sealing engagement with the second window panel when moving from the retracted position into the extended position; and wherein the second window panel travels along the second path away from and out of sealing engagement with the first window panel and then vertically downward when moving from the extended position into the retracted position to permit independent pivotable movement of the second door relative to the first door, and the second window panel travels along the second path vertically upward and then toward and into sealing engagement with the first window panel when moving from the retracted position into the extended position.

12. A pair of headerless opposing hinged doors as set forth in claim 11 further comprising a seal affixed to and moveable with at least one of the first window panel and the second window panel and configured for sealing between the first window panel and the second window panel when in their respective extended positions.

13. A pair of headerless opposing hinged doors as set forth in claim 12 wherein the seal includes a first seal affixed to and moveable with the first window panel and a second seal affixed to and moveable with the second window panel.

14. A pair of headerless opposing hinged doors as set forth in claim 12 wherein the seal is disposed about an outer periphery of one of the first window panel and the second window panel.

15. A pair of headerless opposing hinged doors as set forth in claim 12 wherein at least one of the first door and the second include a handle operatively connected to the one of the first window panel and the second window panel associated therewith, wherein the one of the first window panel and the second window panel operatively connected to the handle is automatically moveable from the extended position into the retracted position to disengage the seal between the first window panel and the second window panel upon actuation of the handle.

16. A pair of headerless opposing hinged doors as set forth in claim 11 wherein the first path and the second path each include a substantially horizontal portion and a substantially vertical portion.

17. A pair of headerless opposing hinged doors as set forth in claim 16 wherein the substantially horizontal portion and the substantially vertical portion are connected by a curved portion.

* * * * *